United States Patent
Widmaier

[15] 3,690,097
[45] Sept. 12, 1972

[54] APPARATUS HAVING INTERCONNECTED HYDRAULIC UNITS OPERABLE AS PUMPS, HYDRAULIC MOTORS, AND AS A HYDROSTATIC TRANSMISSION

[72] Inventor: Dieter Widmaier, Fellbach, Germany

[73] Assignee: Robert Bosch GmbH, Stuttgart, Germany

[22] Filed: Oct. 2, 1970

[21] Appl. No.: 77,641

[30] Foreign Application Priority Data
Oct. 3, 1969 Germany..........P 19 49 973.1

[52] U.S. Cl. .....................60/53 B, 91/492
[51] Int. Cl. ..........................F16d 33/00, F01b 1/06
[58] Field of Search..........60/53 B; 91/492; 417/237

[56] References Cited
UNITED STATES PATENTS

| | | |
|---|---|---|
| 2,303,685 | 12/1942 | Eden et al. ..................60/53 B |
| 2,208,568 | 7/1940 | Benedek......................91/492 |
| 2,838,003 | 6/1958 | Joy............................60/53 B |

Primary Examiner—Martin P. Schwadron
Assistant Examiner—A. M. Zupcic
Attorney—Michael S. Striker

[57] ABSTRACT

The rotors of two hydraulic radial piston units, one of which is driven by a prime mover, can be connected and disconnected by mechanical coupling means so that one, or both units pump pressure fluid to a hydraulic consumer motor, dependent on the required consumer load. A valve can be operated to hydraulically connect the units so that the driven pump unit delivers pressure fluid to the other hydraulic unit which operates as the motor of a hydrostatic transmission to rotate an output shaft.

14 Claims, 6 Drawing Figures

INVENTOR:
Dieter WIDMAIER
by: Michael S. Striker
Attorney

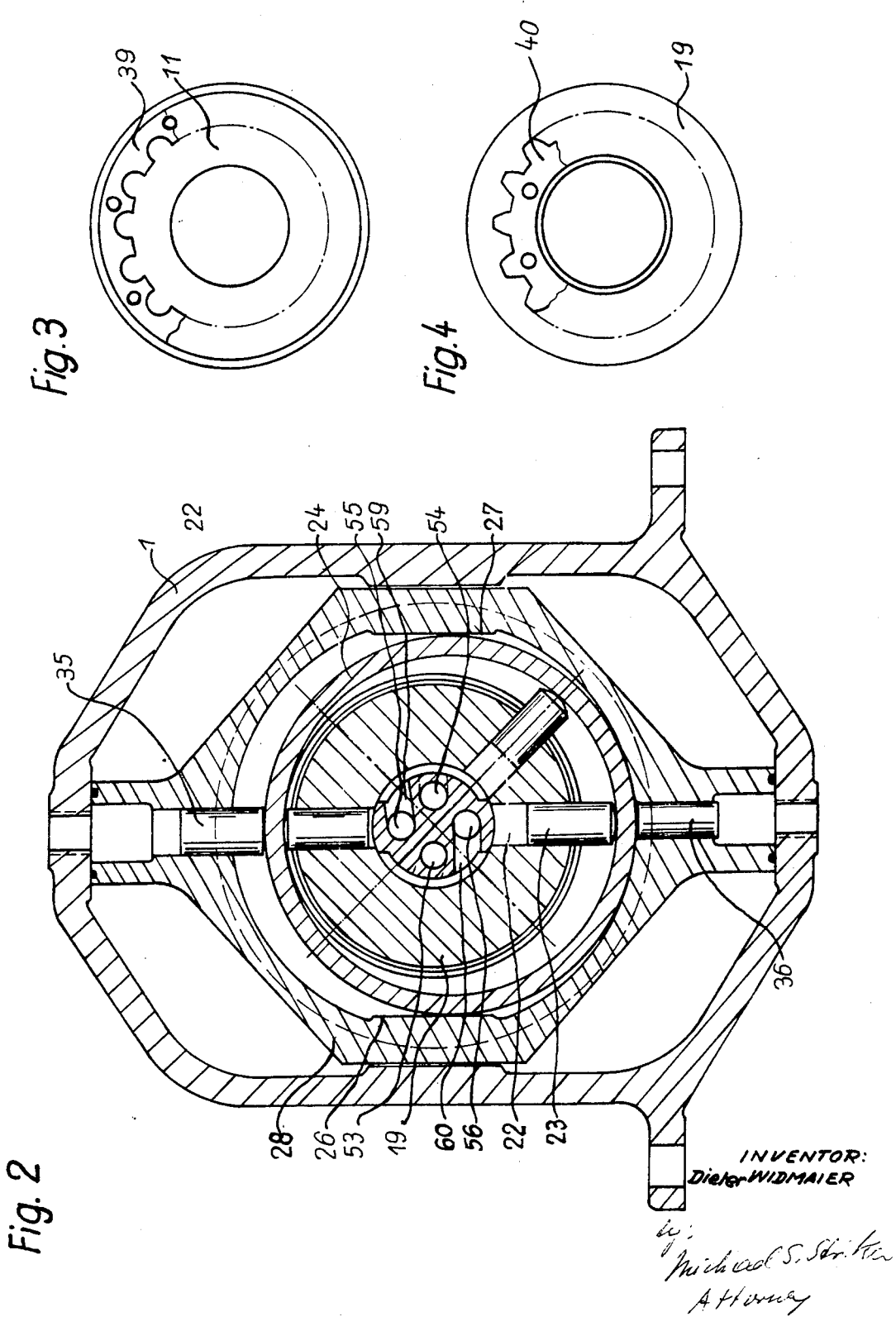

INVENTOR:
Dieter WIDMAIER

APPARATUS HAVING INTERCONNECTED HYDRAULIC UNITS OPERABLE AS PUMPS, HYDRAULIC MOTORS, AND AS A HYDROSTATIC TRANSMISSION

BACKGROUND OF THE INVENTION

The present invention relates to a hydraulic apparatus which includes two radial piston pump units, one of which is driven by a prime mover. A hydraulic apparatus of this type is known from the German Pat. No. 1,107,085. It is possible to vary the pumped amount from zero to the maximum output of both pump units. However, the apparatus has the disadvantage that at all times, both hydraulic pump units are driven, even if very little fluid is required by a consumer motor. This causes unnecessary leakage losses, friction losses, and splashing losses, as well as unnecessary wear, and the hydraulic units are not used to the best advantage. Furthermore, the apparatus can only be used for pumping a fluid, and cannot be operated as a hydraulic motor.

SUMMARY OF THE INVENTION

It is one object of the invention to overcome the disadvantages of prior art hydraulic apparatus including two hydraulic units, and to provide an economically operating hydraulic apparatus, which can be used for many purposes.

Another object of the invention is to provide a hydraulic apparatus which includes two hydraulic units, one of which can be entirely disconnected if only a small output is required, or which may be used as a hydraulic motor so that the apparatus becomes a hydrostatic transmission.

In accordance with the invention, these objects are obtained by mechanically connecting two rotary means of two hydraulic radial piston units, if a high delivery output is desired, while driving only one of the radial piston pump units if a smaller delivery output is sufficient for the consumer motor. In accordance with the invention, a valve means is provided which is connected by a consumer conduit with the hydraulic consumer motor, and which can be operated to connect in one control position only one of the hydraulic units, and in another control position both units hydraulically with the consumer motor.

This arrangement has the advantage that, if only a small volume of pressure fluid is required, one of the two hydraulic units can be stopped while the coupling between the two units is disengaged. This has the advantage that the load on the prime mover is reduced, and friction losses, leakage losses, and splashing losses are reduced. The same advantages result when the hydraulic units are used as hydraulic motors by pumping fluid from the consumer conduit into the same.

In the preferred embodiment of the invention, the valve means have a third control position in which the entire pressure fluid pumped by the driven hydraulic unit is supplied to the other hydraulic unit which operates as a hydraulic motor. The coupling means between the rotors of the two units is disengaged during this type of operation in which the apparatus forms a hydrostatic transmission. The apparatus may drive a vehicle, and when the destination is reached, the apparatus can be operated as a single or multiple pump for driving hydraulic motors of loading apparatus, such as fork lifts and the like.

My U.S. Patent applications Ser. No. 35,427 now U.S. Pat. No. 3,643,433 and Ser. No. 44,329 now U.S. Pat. No. 3,643,434 are directed to related subject matter, but disclose hydraulic units of a different construction.

One embodiment of the invention comprises first and second hydraulic units including stator means having a journal with an axis and being formed with duct means having ports, and first and second rotary means including first and second rotary cylinder means mounted on the journal for rotation about the axis of the same and having first and second radial chambers communicating with the ports of the duct means, and first and second piston means mounted in the chambers of the first and second cylinder means, respectively, for radial movement toward and away from the axis of the journal.

Drive means for driving the first rotary means, and guide means for operating the first and second piston means during rotation of the first and second cylinder means are provided.

Connecting means, such as a claw coupling, have an engaged position mechanically connecting the first and second rotary cylinder means for rotation, and a disengaged position.

Valve means are provided which connect the duct means with a consumer conduit means and have a first control position for guiding the pressure fluid from both the first and second units through the duct means to the consumer conduit means while the connecting means is in the engaged position. The valve means has a second control position for guiding pressure fluid only from the first hydraulic unit through the duct means to the consumer conduit means while the connecting means is in the disengaged position.

Preferably, the valve means has a third control position for connecting inlet and outlet ducts of the duct means while the connecting coupling means is in the disengaged position so that the pressure fluid discharged from the first hydraulic unit flows into the second hydraulic unit and operates the same as a hydraulic motor so that the first and second units form a hydrostatic transmission. In this condition of the apparatus, the duct means are entirely disconnected from the consumer conduit means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a cross sectional view taken on line II—II in FIG. 1;

FIGS. 3 and 4 illustrate a detail of the apparatus;

DESCRIPTION OF THE PREFERRED EMBODIMENT

Figure 1:
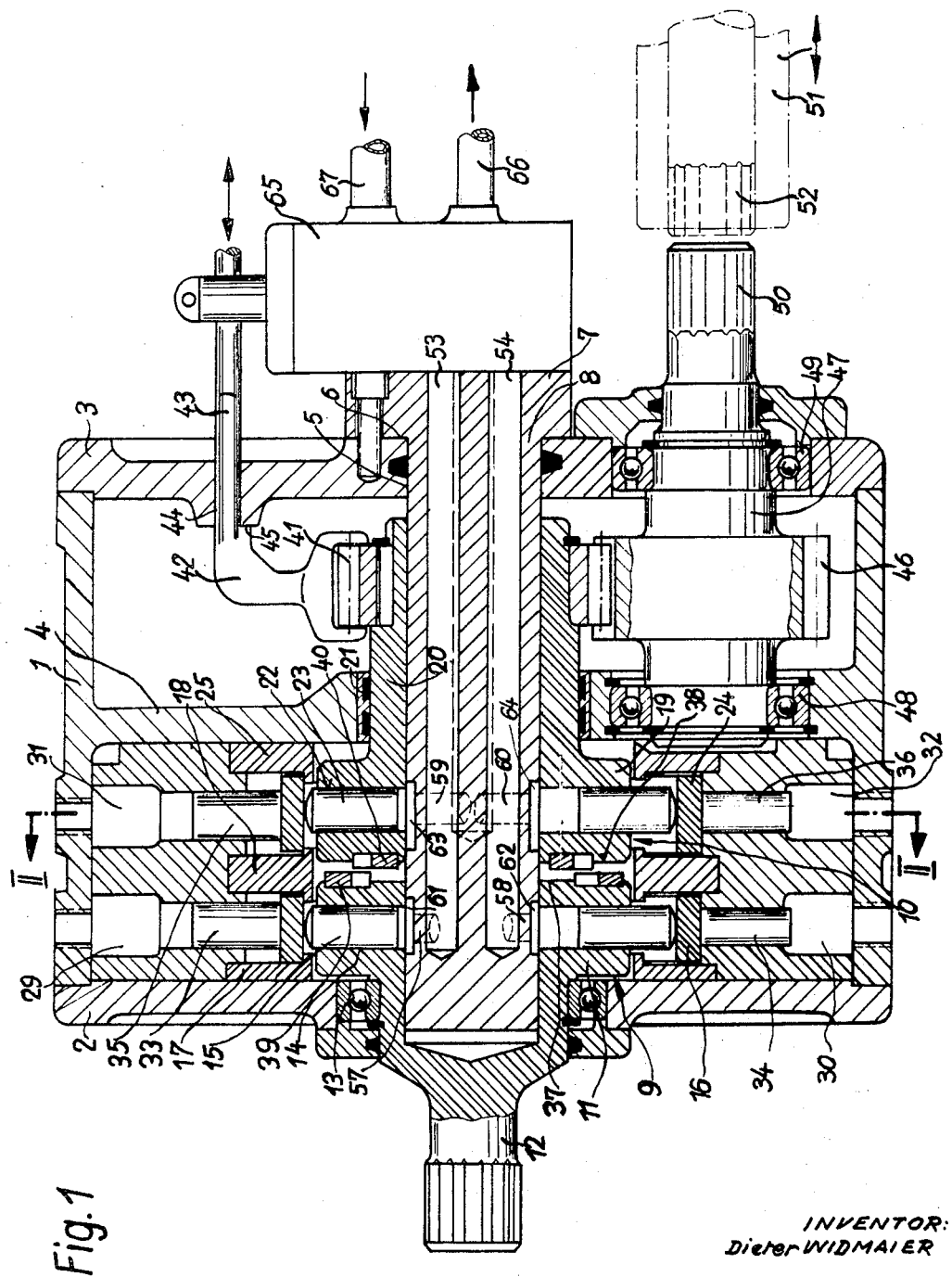
FIG. 1 is an axial sectional schematic view illustrating an apparatus according to the invention.

Referring now to FIG. 1, casing 1 has a left cover 2 and a right cover 3, and a partitioning wall 4. Cover 3 has a central bore 5 with an adjacent surface 6 to which the flange 7 of a journal 8 is secured by screws. Journal 8 projects through bore 5 through the interior of casing 1 and has a free end portion located in the region of cover 2.

Two hydraulic radial piston units 9 and 10 are mounted in the housing. Hydraulic unit 9 has a cylinder means 11 which is connected by an intermediate portion with a drive shaft 12, driven by a prime mover, not shown.

Cylinder means 11 is rotatably mounted on journal 8, but cannot be moved in axial direction. A roller bearing 13 supports the cylinder means 11 in the casing cover 2, and since journal 8 is located in a bore of the cylinder means 11, journal 8 is also supported. By this arrangement, journal 8 is supported along its entire length, and is capable of resisting even strong radial forces, which occur during the operation of the hydraulic units 9 and 10.

Cylinder body 11 has several radial bores 14 forming chambers for slidably guiding pistons 15 in sealing engagement. Due to the arrangement of the bores 14, the pistons 15 move in radial direction. The end faces of pistons 15 are rounded, and abut an annular member 16 which guides the pistons during rotation of the rotary means 12, 11 so that the pistons move in radial direction into and out of the respective chambers whereby the volume of the same is increased and decreased, respectively.

The second hydraulic unit 10 also has a cylinder body 19 which is formed with bores 22 for radially moving pistons 23 which have rounded end faces abutting annular member 24.

As best seen in FIG. 2, annular member 24, and also annular member 16, are guided along two confronting straight guide faces 26 and 27 of an insert 28 in casing 1. Pistons 33 and 34 abut the outside of annular member 16, and pistons 35 and 36 abut the outside of annular member 24, and are subjected to fluid pressure to hold the annular guide members 16 and 24 for the pistons 15 and 23 in the desired position. Annular guide members 16 and 24 are laterally guided by fixed guide rings 17, 18 and 25 which are secured to the casing. Cylinder means 19 of hydraulic unit 10 has a projecting hub portion 20 mounted in a bearing 21 of partitioning wall 4. When pressure fluid is supplied to the cylinders of the adjusting pistons 33, 34, 35, 36, the eccentricity of annular guide members 16 and 24 can be adjusted. The annular guide member slide on the straight guide faces 26 and 27.

On the confronting transverse faces 37 and 38 of cylinder means 11 and 19, connecting means are provided by which the rotary means of the hydraulic units 9 and 10 can be selectively connected or disengaged from each other. The connecting means is preferably a claw or gear coupling, consisting of a ring 39 having inner teeth and being secured to the face 37 of cylinder body 11, and a fixed gear ring having outer teeth 40 and being fixed to the surface 38 of cylinder body 19. The construction of the coupling members is best seen in FIGS. 3 and 4.

A gear 41 is fixed to the projecting hub portion 20 of cylinder body 19, and is embraced by a shifting fork 42 whose arm 43 passes through an opening 44 in the lateral cover 3 of casing 1. Arm 43 has an abutment 45 which serves as a stop for determining one of two axially shifted positions of cylinder body 19.

Another gear 46 is in meshing engagement with gear 41, and fixed to an output shaft 47 which is mounted in two bearings 48 and 49, one of which is mounted on partitioning wall 4, while the other is supported by cover 3. The end portion of output shaft 47 which projects out of the casing, has splines which permit a connection with a shaft 52 when a coupling ring 51 with inner teeth is axially displaced to engage portion 50.

Journal 8 has four ducts in the form of blind bores 53 to 56 which transport fluid to and from the hydraulic units 9 and 10. The ducts 53 and 54 are associated with the hydraulic unit 9, and ducts 55, and 56 are associated with the hydraulic unit 10. A transverse bore 57 to 60 ends in each longitudinal duct 53 to 56. On the periphery of journal 8, four control slots 61 to 64 are provided which communicate through the respective transverse bores with the respective ducts 53 to 56. The control slots 63 and 64 of the hydraulic unit 10 are longer in axial direction than the control slots 61,62 of the hydraulic unit 9 so that the communication is maintained in axially displaced positions of cylinder body 19 in which the same is coupled or disengaged from the cylinder body 11 of the first hydraulic unit 9. For clarity's sake, FIGS. 1, 5, and 6 illustrate the axial ducts, the transverse bores, and the control slots in a position turned 90°.

Figure 5:
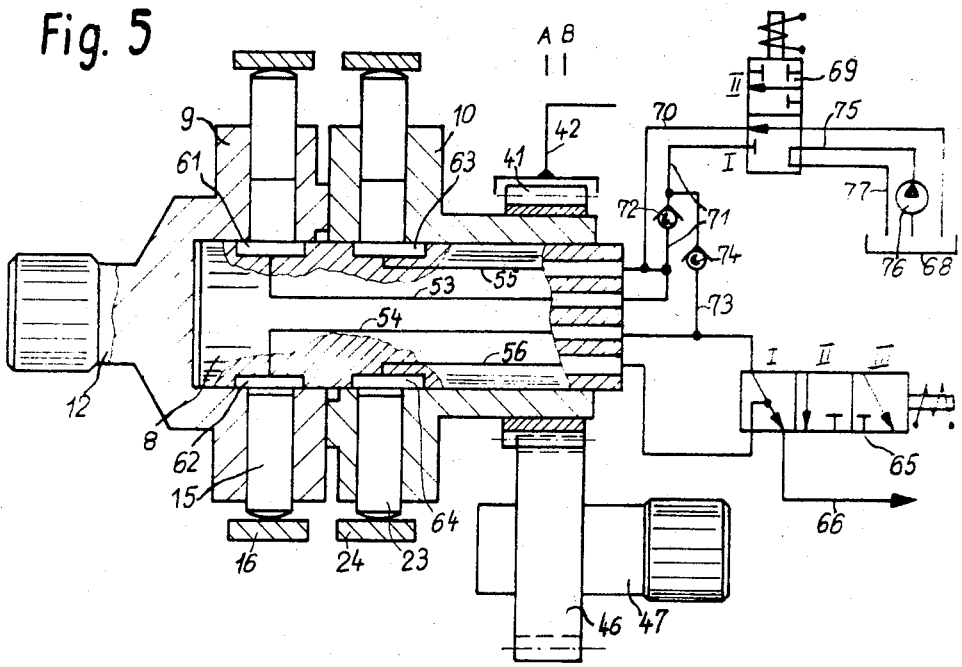
FIG. 5 is a schematic view illustrating the apparatus of FIG. 1, partially in section, together with a diagram illustrating the hydraulic circuit of the invention in a position in which both hydraulic units operate as pumps.
Figure 6:
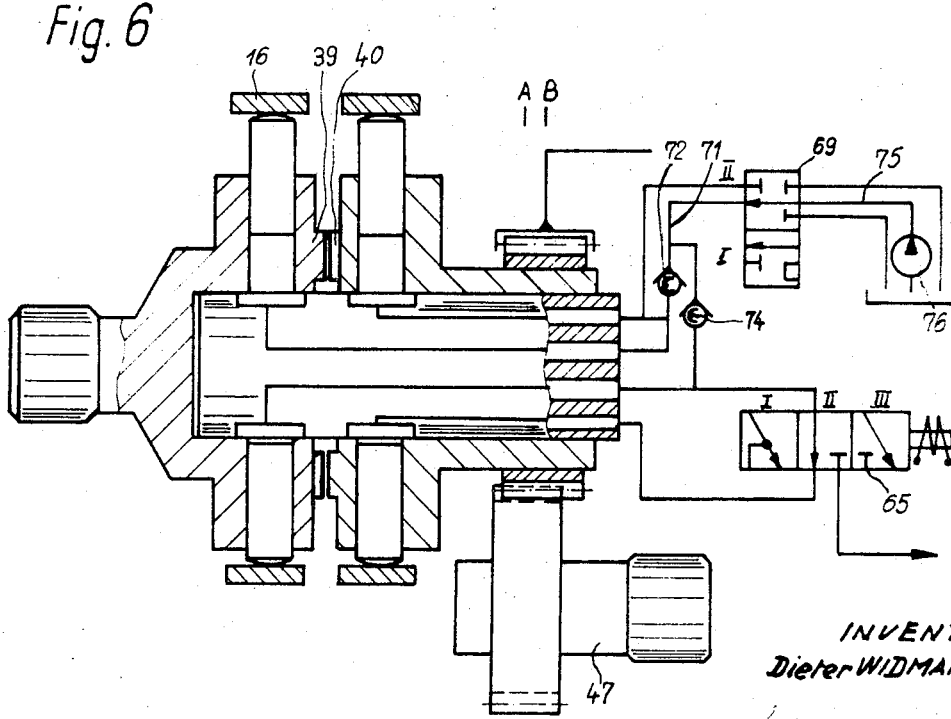
FIG. 6 is a schematic, partly sectional view, including a diagram illustrating the hydraulic circuit of the invention in another position in which only one hydraulic unit operates as a pump, corresponding to the condition illustrated in FIG. 1 and the other unit operates as a hydraulic motor forming a hydrostatic transmission with the pump unit.

Journal 8 has a portion in the form of a flange projecting out of casing 3 and supporting a control valve means 65 which includes a valve cylinder having ports communicating with ducts 53 and 54, with a consumer conduit 66 which leads to a hydraulic consumer motor, not shown, and with a conduit 67 which is connected to a container for the fluid, preferably through another valve 69 shown in FIGS. 5 and 6 which illustrate the apparatus in connection with the hydraulic circuit by which the apparatus can be set to different functions.

The valve 65 can be combined with valve 69 in a single valve, and the conduits shown outside of the apparatus in FIGS. 5 and 6, may be provided in the form of ducts within the stator part supported by casing 1.

Valve means 65 has three control positions I, II and III. The ducts 54 and 56, which are respectively associated with the two hydraulic units 9 and 10, end in ports of the valve cylinder of valve 65. The three control positions of the valve slide of valve 65 are schematically shown, and it will be seen that the ducts 54 and 56 are connected in control position I with the consumer conduit 66. In the control position II, duct 54 is connected with duct 56, and communication with the consumer conduit 66 is interrupted. In the control position III, only the duct 54 is connected with the consumer conduit 66, while the connection to the duct 56 of the hydraulic unit 10 is interrupted.

Ducts 53 and 54, respectively associated with the hydraulic units 9 and 10, are directly connected with each other and to a conduit 70 which is connected to a port of valve 69. In the position illustrated in FIG. 5, the conduit 70 is connected with another conduit opening into a container 68 from which an auxiliary pump 76 can pump fluid. In the position of FIG. 5, which corresponds to position I of valve 69, the auxiliary pump 76 is connected to a conduit 77 opening into container 68.

The ducts 53 and 55 are connected by a second conduit 71, which contains a check valve 72, with a port on the valve cylinder of valve 69. A conduit 73, connected with duct 54, also ends in conduit 71, and has a check valve 74. The port where conduit 73 opens into conduit 71, is located between check valve 72 and valve 69.

In the position II of valve 69, the auxiliary pump 76 in connected by conduit 75 with conduit 71 and through the check valve 72 with the ducts 53, 55 in journal 8. In the position I of valve 69, the auxiliary pump 76 is connected by the return conduit 77 with container 68 and operates idly, while the connection between conduit 70 and container 68 is established. As schematically indicated, valve 69 and valve means 65 are operated by electromagnetic means which shift the respective valve slides, not shown, in the respective valve cylinders.

The apparatus operates as follows:

If it is to be driven as a double pump, so that both hydraulic units 9 and 10 deliver fluid to the consumer conduit 66, the cylinder bodies 11, 19 of the two units 9, 10, must be coupled with each other by coupling means 39, 40. For this purpose, shifting fork 42 is placed in the position A, see FIG. 5, so that the gear 41 with cylinder body 19 is shifted to the left end in axial direction. Valve means 65 is in control position I, and valve 69 is also in position I. The guide members 16 and 24 are in a predetermined position in which the centers are spaced a desired distance from the axis of journal 8, which is the axis of rotation of the cylinder bodies 11 and 19.

The prime mover, not shown, rotates drive shaft 12 so that the coupled rotary means 11 and 19 of hydraulic units 9 and 10 rotate together so that pistons 15, 23 are displaced by the annular guide members 16 and 24 in the respective chambers whereby pressure fluid is transported through the ducts 54, 56 in journal 8 to valve means 65 where the pumped streams combine and are supplied through the consumer conduit 66 to a hydraulic consumer motor, not shown, which is driven by the high pressure fluid delivered by both hydraulic units. The pistons 15, 23 which communicate with ducts 53 and 55, suck fluid from container 68 through conduit 70, valve 69, and ducts 53, 55. Check valve 74 is closed by the high pressure prevailing in conduit 73, so that no pressure medium can flow from the high pressure side to the suction side of the pumps. The auxiliary pump 76 idles and circulates fluid through conduits 75 and 77 into and out of container 68.

When the apparatus is to be operated in such a manner that both hydraulic units 9 and 10 operate as hydraulic motors, and not as pumps, high pressure fluid is supplied from consumer conduit 66 to the ducts 54 and 56 which causes rotation of the cylinder bodies 11 and 19 due to the displacement of pistons 15 and 23. In this manner, a torque is produced at the output shafts 47 and 12 and the fluid discharged from the hydraulic units 9 and 10 flows back into container 68 through ducts 53, 55 and conduit 70.

When it is desired to operate the apparatus only with the hydraulic unit 9 operating as a pump, due to lesser requirements of the consumer, the shifting fork 42 is placed in the position B, as shown in FIG. 6, so that the coupling means 39, 40 is disengaged, as shown in FIG. 1, whereupon the valve means 65 is placed in the control position III. Drive shaft 12 rotates the cylinder body 11 of the hydraulic unit 9, but cannot rotate the cylinder body 19 of hydraulic unit 10 due to the disengagement of the coupling means 39, 40. Pistons 15 are displaced by the eccentric annular member 16, and deliver pressure fluid through the duct 54 and valve 65 into consumer conduit 66. From container 68, fluid is sucked only from the radially outward moving piston 15 through duct 53, conduit 70, and valve 69. Cylinder body 19 is at a standstill.

When the first hydraulic unit 9 is to be operated as a motor, with the other unit 10 at a standstill, the flow of fluid is reversed.

If the apparatus is to be used as a hydrostatic transmission, the valve means 65 is placed in the control position II, and valve 69 is also placed in the control position II, as shown in FIG. 6. The coupling means 39, 40 is disengaged by fork 42 which is placed in the position B. Cylinder body 11 is driven by drive shaft 12 to rotate. The pressure fluid pumped by the hydraulic unit 9 flows through the duct 54 and valve 65, and through duct 56 of hydraulic unit 10, and causes the same to rotate as a hydraulic motor. The torque produced by the rotary means of the hydraulic unit 10, is transmitted by meshing gears 41, 46 to the output shaft 47, and if desired by operation of the clutch 51, to shaft 52.

Since the hydraulic apparatus in this condition operates as a hydrostatic transmission with a closed hydraulic circuit, it is necessary to replace losses due to leakage. For this purpose, the auxiliary pump 76 pumps fluid at a low pressure through valve 69, conduit 71, and check valve 72 to the low pressure zones at the ducts 53, 55, and at the control slots 61, 63. Check valve 74 is closed, since the pressure in the ducts 54, 56 is substantially higher than the pressure in the ducts 53, 55. The construction and design of the valves 65, 69, and of the respective conduits, has the advantage that during operation as a hydrostatic transmission, a reversal of the direction of rotation is possible, which means that output shaft 47 reverses its rotation. For this purpose, the annular guide member 16 is displaced to a position in which it is eccentric in the opposite direction than before, so that at the control slot 61 high pressure prevails. The pumped pressure fluid flows through duct 53 directly into duct 55 and causes rotation of cylinder body 19. The check valve 72 is closed, and the auxiliary pump 76 transports through check valve 74 and conduit 73 fluid to the lower pressure side, namely to the ducts 54, 56 and the control slots 62, 64.

During operation as a hydraulic transmission, it is possible to divide the path along which the force is transmitted. When the rotary speeds of the two hydraulic units 9 and 10 approach each other, they are connected by the coupling 39, 40, and the torque is mechanically transmitted at a ratio of 1 : 1.

If it is not intended to reverse the direction of rotation, conduit 73 and check valve 74 can be omitted.

When a claw coupling, or other positive coupling means are used for connecting the rotary means 11 and 19 of the hydraulic units 9 and 10, the shifting of the coupling means takes place when the cylinder bodies 11 and 19 are at a standstill. However, if a friction clutch is used, it is possible to couple and disengage the rotary cylinder bodies 11 and 19 also during rotation. The torque of the hydrostatic transmission is delivered at the output shaft 47, or depending on the intended operations, over the shaft 52.

The gears 41 and 46 can be replaced by belts and pulleys, or friction wheels, and it is also possible to mount the gear 46 shiftable on output shaft 47, so that it can be separated from gear 41 during operations of the units as pumps or motors, depending on the use of the apparatus. The connecting means for the hydraulic units can also be arranged on the outside of the cylinder body, but the illustrated arrangement in which the coupling means 39 and 40 are located between lateral faces of the cylinder bodies, is particularly compact and simple.

It is possible to make only one hydraulic unit, preferably the hydraulic unit 9, adjustable, while the respective other unit has a constant delivery volume and fluid accepting volume.

If the apparatus is used for driving a vehicle, and also as pump and motor under different operational conditions, it is advantageous to provide the additional shaft 52 by which the wheels of a vehicle are driven. In other cases, a gear can be placed on the splined portion of output shaft 50 for driving other transmission gears connected to a machine.

The hydraulic apparatus of the invention is particularly advantageous for use on vehicles. The apparatus can be used as drive means for the vehicle, and when the same arrives at its destination, the apparatus can operate as a single pump or double pump to supply hydraulic motors with the driving pressure fluid. Depending on the volume required by the respective consumer machine, the apparatus is operated as a single pump or as a double pump. If the load is low, and only one hydraulic unit 9 is operated, the leakage losses, and also friction losses, and other losses are reduced as compared with an arrangement in which both units must operate and the load is low. The apparatus can be mounted on dredging equipment, on movable cranes, on tractors, and the like. However, it is also possible to use the hydraulic apparatus as an independent transportable machine, so that the apparatus is extremely versatile and can be used for many purposes. It is evidently also possible to construct the apparatus only as a combination of a single pump with a motor, or as a double pump with a motor. In such an arrangement, the valve 69 has only the two control positions I and II, and valve 69 with auxiliary pump 76 may be omitted. The ducts 53 and 55 are then directly connected to container 66. When the apparatus is operated as a single pump and motor, the auxiliary pump can also be disconnected.

The radial piston hydraulic units have been described as radial piston machines, but it is also possible to use vane machines, and ball piston machines.

It will be understood that each of the elements described above, or two or more together, may also find a useful application in other types of hydraulic apparatus differing from the types described above.

While the invention has been illustrated and described as embodied in a hydraulic apparatus including a plurality of radial piston pumps which can be hydraulically and mechanically interconnected, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristicts of the generic or specific aspects of this invention and, therefore, such adaptations should and are intended to be comprehended within the meaning and range of equivalence of the following claims.

What is claim as new and desired to be protected by Letters Patent is set forth in the appended claims.

I claim:

1. Apparatus having interconnected hydraulic units, comprising first and second hydraulic units including stator means having a journal with an axis and being formed with duct means having ports and including inlet and outlet ducts, and first and second rotary means including first and second rotary cylinder means mounted on said journal for rotation about said axis and having first and second radial chambers communicating with said ports of said duct means, and first and second piston means mounted in said chambers of said first and second cylinder means, respectively, for radial movement toward and away from said axis; drive means for driving said first rotary means; guide means mounted on said stator means for operating said first and second piston means during rotation of said first and second cylinder means, respectively; connecting means having an engaged position mechanically connecting said first and second rotary cylinder means for rotation, and a disengaged position; consumer conduit means; valve means connecting said duct means with said consumer conduit means and having a first control position for guiding pressure fluid from both said first and second hydraulic units through said duct means to said consumer conduit means while said connecting means is in said engaged position, and a second control position for guiding pressure fluid only from said first unit through said duct means to said consumer conduit means while said connecting means is in said disengaged position, and a third control position closing said consumer conduit means and connecting said inlet and outlet ducts with each other while said connecting means is in said disengaged position so that the pressure fluid discharged from said first hydraulic unit flows into said second hydraulic unit and operates the same as a hydraulic motor whereby said first and second hydraulic units form a hydrostatic transmission; and operating means for placing said connecting means selectively in said engaged and disengaged positions, and said valve means selectively in said first, second, and third control positions.

2. Apparatus as claimed in claim 1, wherein said first and second cylinder means have confronting radial faces; and wherein said connecting means include first and second coupling means respectively mounted on said radial faces.

3. Apparatus as claimed in claim 1, wherein said second rotary means includes a first gear, and comprising an output shaft, and a second gear on said output shaft meshing with said first gear so that said output shaft is driven by said second hydraulic unit operating as a hydraulic motor.

4. Apparatus as claimed in claim 3, wherein said second rotary means is mounted on said journal for axial movement; wherein said operating means include a fork means engaging said first gear for shifting the same with said second rotary cylinder means toward and away from said first rotary cylinder means; and wherein said connecting means include first and second coupling means on said first and second rotary cylinder means engaging each other in said engaged position when said second cylinder means is displaced toward said first cylinder means.

5. Apparatus as claimed in claim 4 wherein said first and second coupling means have interengaging projections and recesses.

6. Apparatus as claimed in claim 4 wherein said first and second coupling means frictionally engage each other in said engaged position.

7. Apparatus as claimed in claim 1 wherein said inlet and outlet ducts include first and second ducts communicating with said first and second chambers, respectively; wherein said valve means has a third control position for connecting said first ducts of said first hydraulic unit with said second ducts of said second hydraulic unit while said connecting means is in said disengaged position so that pressure fluid discharged from said first hydraulic unit flows into said second hydraulic unit operating the same as a hydraulic motor; comprising a container for fluid; and wherein said valve means includes a valve cylinder having a first port connected with said consumer conduit means, a second port communicating with said container, and with a first duct of said first hydraulic unit, and a third port communicating with a second duct of said second hydraulic unit, and a valve slide movable in said valve cylinder between said first, second, and third control positions and controlling the flow through said first, second, and third ports.

8. Apparatus as claimed in claim 7, comprising a casing supporting said stator means; wherein said journal is fixedly secured to said casing and has a portion projecting out of said casing; and wherein said valve means is mounted on said portion of said journal.

9. Apparatus as claimed in claim 7 comprising an auxiliary pump; and a valve having a first position connecting said auxiliary pump with said first and second rotary hydraulic units, and a second position disconnecting said auxiliary pump from said first and second units, and connecting said first and second hydraulic units with said container.

10. Apparatus as claimed in claim 9 comprising check valve means between said auxiliary pump and said first and second hydraulic units.

11. Apparatus as claimed in claim 10 comprising a conduit connecting said second port of said valve cylinder with said valve and said valve with said container; and another check valve in said conduit between said second port and said valve.

12. Apparatus as claimed in claim 11 wherein said operating means include first electromagnetic means for moving said valve means between said first, second, and third control positions, said second electromagnetic means for moving said valve between said first and second positions of the same.

13. Apparatus as claimed in claim 1 comprising an output shaft driven from said second rotary means; a machine shaft; and coupling means for connecting and disconnecting said output shaft and said machine shaft.

14. Apparatus having interconnected hydraulic units, comprising first and second hydraulic units including stator means having a journal with an axis and being formed with duct means having ports, and first and second rotary means including first and second rotary cylinder means mounted on said journal for rotation about said axis and having first and second radial chambers communicating with said ports of said duct means, and first and second piston means mounted in said chambers of said first and second cylinder means, respectively, for radial movement toward and away from said axis, said first and second cylinder means having confronting radial faces; drive means for driving said first rotary means; guide means mounted on said stator means for operating said first and second piston means during rotation of said first and second cylinder means, respectively; connecting means having an engaged position mechanically connecting said first and second rotary cylinder means for rotation, and a disengaged position, said connecting means including first and second coupling means respectively mounted on said radial faces; one of said cylinder means being mounted on said journal for movement in axial direction with the respective coupling means so that the same engages the other coupling means in said engaged position of said connecting means; consumer conduit means; valve means connecting said duct means with said consumer conduit means and having a first control position for guiding pressure fluid from both said first and second hydraulic units through said duct means to said consumer conduit means while said connecting means is in said engaged position, and at least a second control position for guiding pressure fluid only from said first unit through said duct means to said consumer conduit means while said connecting means is in said disengaged position; and operating means for placing said connecting means selectively in said engaged and disengaged positions, and said valve means selectively in said first, and second control positions.

* * * * *